United States Patent
Xiong et al.

(10) Patent No.: US 12,013,902 B2
(45) Date of Patent: *Jun. 18, 2024

(54) INTER-DOCUMENT ATTENTION MECHANISM

(71) Applicant: Microsoft Technology Licensing, LLC, Redmond, WA (US)

(72) Inventors: Chenyan Xiong, Bellevue, WA (US); Chen Zhao, Greenbelt, MD (US); Corbin Louis Rosset, Seattle, WA (US); Paul Nathan Bennett, Redmond, WA (US); Xia Song, Redmond, WA (US); Saurabh Kumar Tiwary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,854

(22) Filed: Jul. 18, 2022

(65) Prior Publication Data
US 2022/0374479 A1 Nov. 24, 2022

Related U.S. Application Data

(63) Continuation of application No. 16/582,582, filed on Sep. 25, 2019, now Pat. No. 11,423,093.

(51) Int. Cl.
*G06F 16/93* (2019.01)
*G06F 16/903* (2019.01)
*G06N 3/04* (2023.01)
*G06N 3/08* (2023.01)

(52) U.S. Cl.
CPC ........ *G06F 16/93* (2019.01); *G06F 16/90335* (2019.01); *G06N 3/04* (2013.01); *G06N 3/08* (2013.01)

(58) Field of Classification Search
CPC ............ G06N 3/08; G06N 20/00; G06N 3/04; G06N 5/04; G06F 40/20; G06F 40/40; G06F 16/93; G06F 16/9024; G06F 16/90335; G06F 16/3344; G06F 40/216; G06F 40/47

See application file for complete search history.

*Primary Examiner* — Hau H Hoang
(74) *Attorney, Agent, or Firm* — Rainier Patents, P.S.

(57) ABSTRACT

This document relates to natural language processing using a framework such as a neural network. One example method involves obtaining a first document and a second document and propagating attention from the first document to the second document. The example method also involves producing contextualized semantic representations of individual words in the second document based at least on the propagating. The contextualized semantic representations can provide a basis for performing one or more natural language processing operations.

20 Claims, 9 Drawing Sheets

302

ABC Corporation
https://www.webencyclopedia.org/ABC_corp

ABC Corporation is the largest manufacturer of weather sensors in North America. ABC Corporation's current CEO is S. Duke, elected by shareholders in 2017.

CEO: S. Duke
Chairman: P. Marmot

304

Phil D. Marmot Biography
https://www.webencyclopedia.org/P_Marmot

Phil Marmot is a retired entrepreneur that now serves on the board of several philanthropic organizations. Mr. Marmot founded North America's largest manufacturer of weather sensors while majoring in meteorology at G. Day University, and continues to serve as Chairman of the Board."

306

G. Day University
https://g_day.edu/contact

G. Day University is a small liberal arts college in Punxsutawney, Pennsylvania. We offer coursework in ... ⟵ 106

FIG. 3

INTER-DOCUMENT ATTENTION MECHANISM

BACKGROUND

Search engines are reasonably proficient at responding to many different types of queries. For instance, existing search algorithms provide good precision and recall for most queries, i.e., the documents returned by a search generally are relevant to the query and relatively few relevant documents are missed. However, in some cases, the answer to a query is not necessarily found in a single document returned for a search query. Efforts to accurately answer queries that involve reasoning over multiple different documents have met with limited success.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for natural language processing. One example includes a method or technique that can be performed on a computing device. The method or technique can include receiving a query and retrieving a plurality of result documents related to the query. The method or technique can also include establishing an evidence graph by linking individual result documents. The method or technique can also include obtaining contextualized semantic representations for individual words in a second result document by propagating inter-document attention from a first result document that is linked to the second result document in the evidence graph. The method or technique can also include processing the contextualized semantic representations of the individual words in the second result document using a machine learning model to obtain an answer to the query. The method or technique can also include outputting the answer in response to the query.

Another example includes a computer-readable storage medium storing computer-readable instructions which, when executed by a hardware processing unit, cause the hardware processing unit to perform acts. The acts can include obtaining a first document and a second document. The acts can also include propagating attention from the first document to the second document. The acts can also include producing contextualized semantic representations of individual words in the second document based at least on the propagating. The contextualized semantic representations can provide a basis for performing one or more natural language processing operations.

Another example includes a system having a hardware processing unit and a storage resource storing computer-readable instructions. When executed by the hardware processing unit, the computer-readable instructions can cause the hardware processing unit to receive a query. The computer-readable instructions can also cause the hardware processing unit to obtain a plurality of search results that are responsive to the query and process the plurality of search results using a transformer having an inter-document attention mechanism to obtain an answer to the query. The computer-readable instructions can also cause the hardware processing unit to respond to the query with the answer.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 3 illustrates example documents that can be used to derive an answer to a query, consistent with some implementations of the present concepts.

DETAILED DESCRIPTION

Overview

Figure 1:
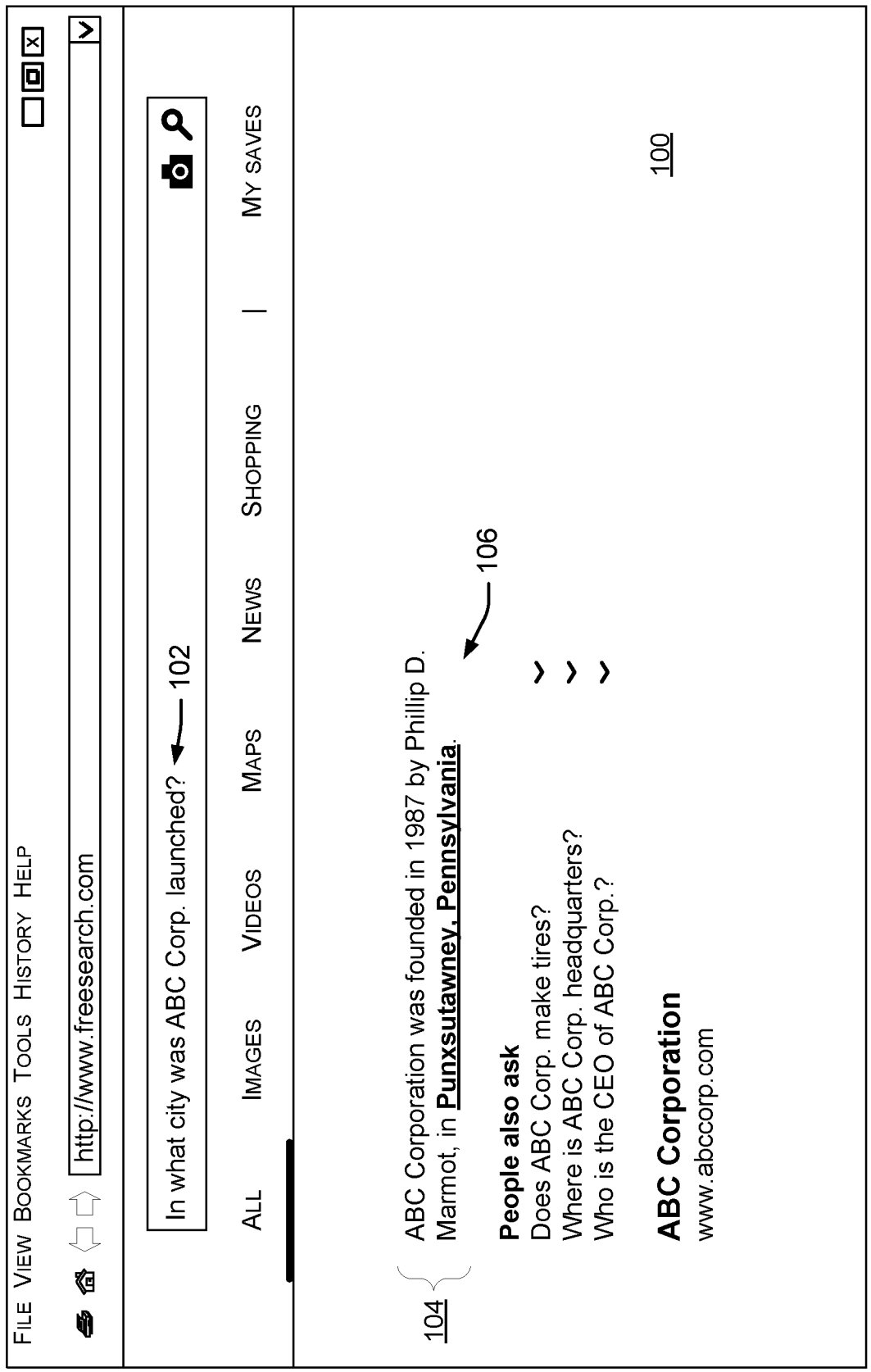
FIGS. 1 and 2 illustrate example user experiences for question answering scenarios, consistent with some implementations of the present concepts.

There are various types of frameworks that have been used for natural language processing. For instance, rules-based systems, hidden Markov models, and statistical models have been employed to perform various natural language processing tasks, such as part-of-speech tagging or machine translation. Another type of model that has been successfully used for natural language processing is a neural network.

A neural network is a type of machine learning model that uses layers of nodes to perform specific operations. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes.

One broad application of neural networks in natural language processing is for encoding and decoding of semantic embeddings. Generally, an encoder maps a word or group of words to a semantic representation, such as a vector, that represents the meaning of the word or group of words. Conversely, a decoder maps a semantic representation to a word or group of words. Generally, words with similar meanings generally have corresponding encodings that are relatively close together in a vector space, and words with very different meanings have corresponding encodings that are relatively distant from one another in the vector space.

The meaning of a given word is generally informed by the context in which the word appears, e.g., other words in the same sentence or document. One high-level approach for modeling the context in which a word appears (e.g., a sentence) is to model the sentence or document as a sequence of words. For instance, a recurrent neural network can input a sequence of tokens while maintaining a representation of one or more previously-input tokens. As each new word is input into the recurrent neural network, the representation of the previously-input words is updated and used to compute a new representation for the new word. Another approach for modeling context of words in sentences involves the use of attention mechanisms. Generally, attention mechanisms consider contextual relationships between individual words in a given sentence or document on a pairwise basis.

The above approaches can obtain good performance for various natural language processing tasks that involve analyzing an individual document. However, in cases where supporting evidence for a given task is distributed over multiple documents, existing approaches do not always perform well. Generally, this is because existing approaches model text sequentially and do not account for non-sequential relationships between different documents.

The disclosed implementations provide an inter-document attention mechanism that can produce contextualized semantic representations of words that consider evidence contained in multiple documents. For instance, the inter-document attention mechanism can be implemented in a neural network by propagating attention from a first document to a second document that is linked to the first document. The attention can be propagated by adding inter-document contextual information to semantic representations of words in the second document. The inter-document contextual information can be determined based on similarity of those words to the first document. The inter-document contextual information can be incorporated into contextual semantic representations of the words in the second document that convey information gleaned from the first document, even if those words do not also appear in the first document.

In the following examples, the inter-document attention mechanism is illustrated as part of a query answering system. As discussed more below, the inter-document attention mechanism can be employed to select an answer to a query from a given document using supporting evidence provided in one or more other documents. For instance, as described more below, the answer to the query can include a span of words extracted from a particular document.

Example User Experiences

FIG. 1 illustrates an example user experience via a search webpage 100 for a search engine. Here, the user has submitted a query 102 to a search engine via the search webpage. In this example, the query is in the form of a question, "in what city was ABC Corp. launched?" The search engine responds with response 104, e.g., a sentence that answers the user's question. Response 104 includes a span of text 106 that provides the correct answer to the user's question, "Punxsutawney, Pennsylvania," as well as other information relating to the user's question.

Figure 2:
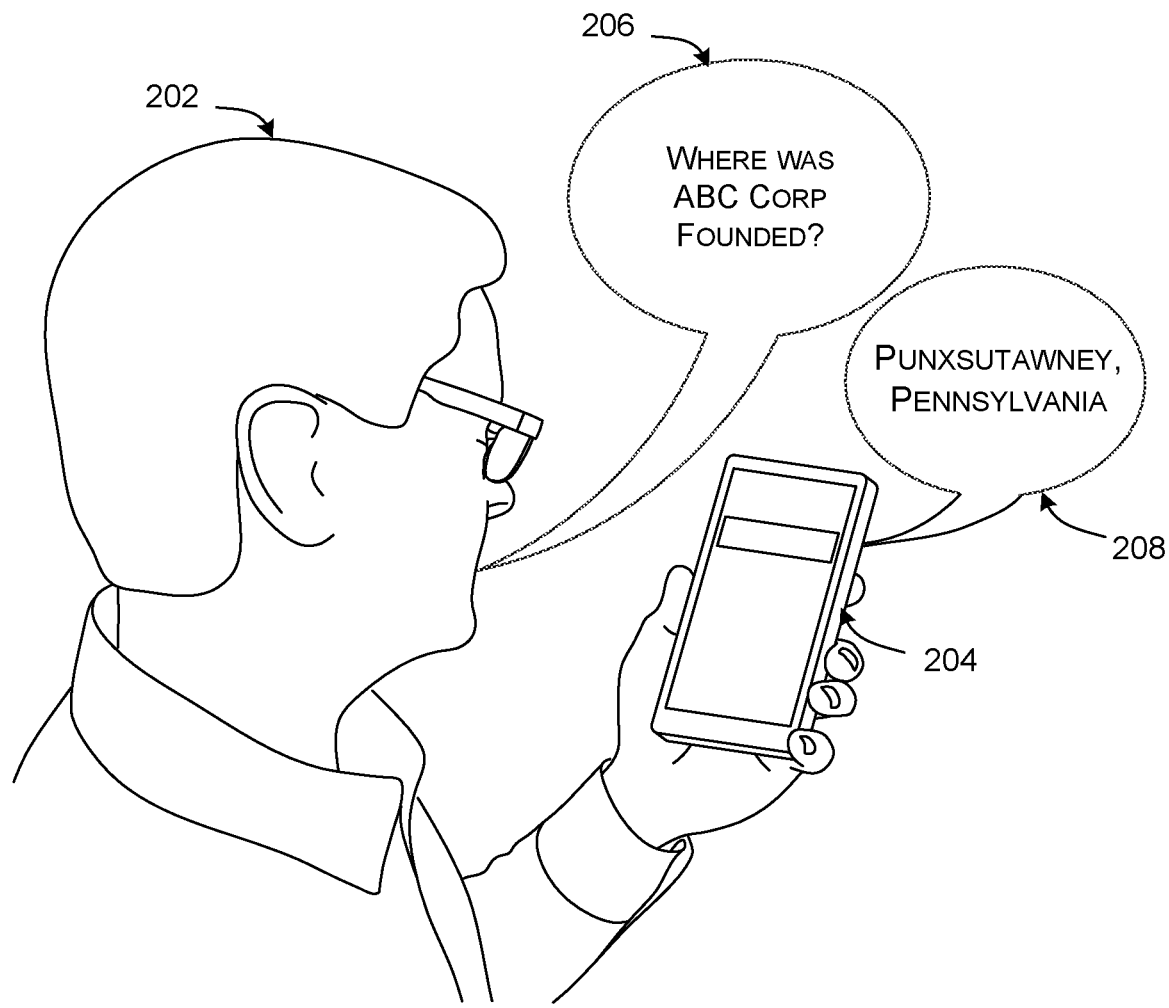

FIG. 2 illustrates an example scenario 200 where a user 202 interacts with client device 204. In this scenario, the user issues a spoken query 206, "Where was ABC Corp. founded?" The client device responds with an audio output 208 that answers the user's question, "Punxsutawney, Pennsylvania" For instance, the audio output can be provided by a digital assistant executing on the client device or on a remote server.

Example Evidence Documents

FIG. 3 illustrates some example documents that can be used to derive the span of text 106. Document 302 is an entry for ABC Corp. from an online encyclopedia, and includes information identifying S. Duke as the CEO and P. Marmot as the chairman of the board. Document 304 is a bio of Phil Marmot from the online encyclopedia, stating that he founded a corporation while attending G. Day University. Document 306 is a web page for G. Day University, stating that the university is located in Punxsutawney, Pennsylvania.

In this example, document 306 provides the span of text 106 that is selected to be included in the answer. However, note that document 306 does not mention ABC Corporation, nor does document 306 mention Phil Marmot. To determine that document 306 includes the answer to the user's question involves two reasoning steps. Document 302 states that ABC Corp. is the largest manufacturer of weather sensors in North America. Document 304 states that Phil Marmot founded the largest manufacturer of weather sensors in North America, without explicitly mentioning ABC Corp. Thus, by reasoning over documents 302 and 304, it can be inferred that Phil Marmot founded ABC Corp.

Next, document 304 also mentions that Phil Marmot was at G. Day University when the company was founded. Although document 304 does not explicitly state the location of G. Day University, the location can be determined from document 306. Thus, by reasoning over documents 304 and 306, it can be inferred that the company was founded in Punxsutawney, PA.

The following discussion describes how an inter-document attention mechanism can be employed to reason over multiple documents such as those described above. This allows a question answering system to perform well in scenarios where finding the correct answer to a query may involve extracting information from intermediary documents that do not explicitly state the answer to the query, such as documents 302 and 304 in the previous example.

Example Workflow

Figure 4:
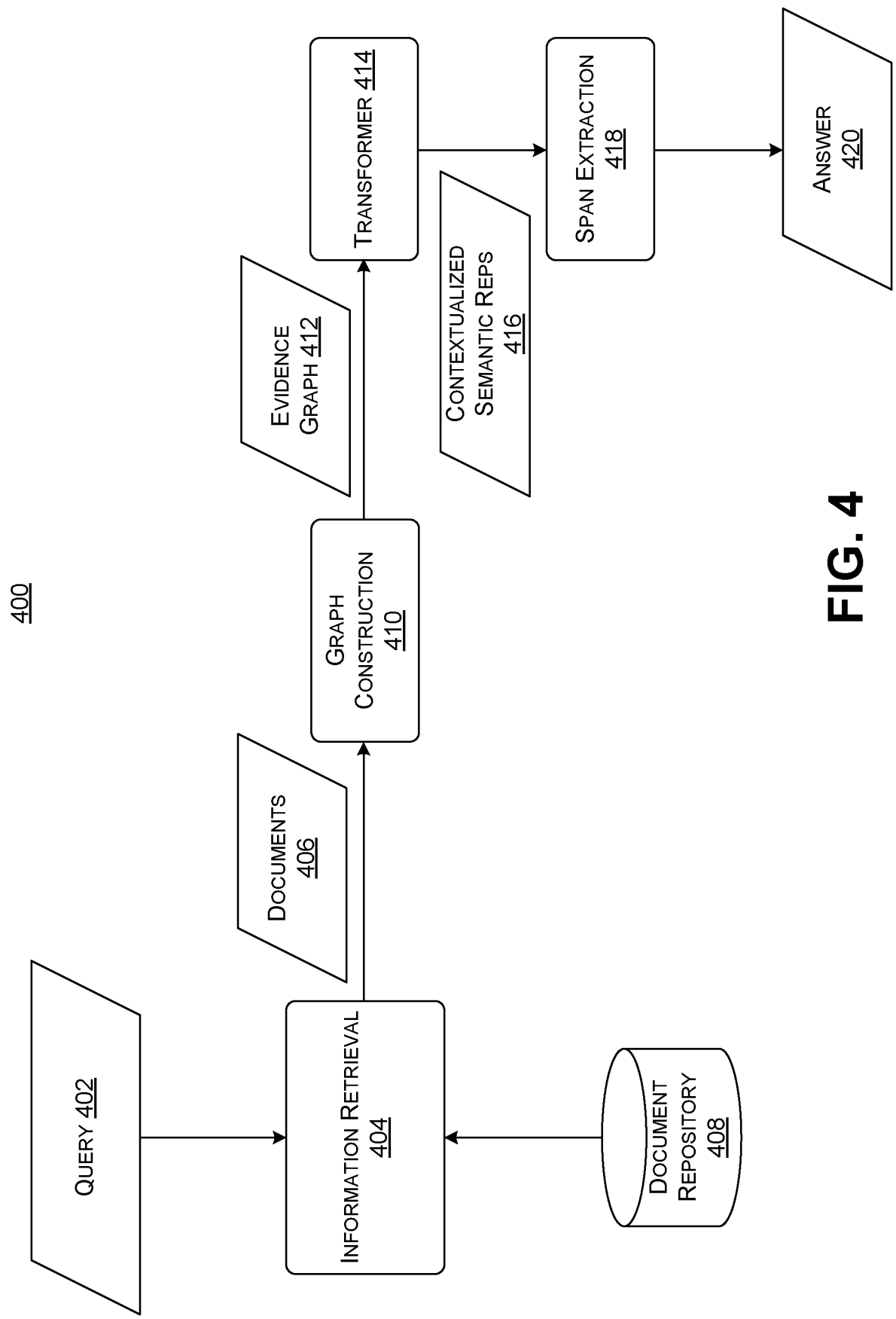
FIG. 4 illustrates an example workflow for providing an answer to a query, consistent with some implementations of the present concepts.

FIG. 4 illustrates an example workflow 400 for returning an answer in response to a query, consistent with some implementations. The workflow starts with a received query 402. Next, information retrieval 404 is performed on the received query to obtain one or more result documents 406 from a document repository 408. As described more below, the retrieved documents can be retrieved using various approaches. For instance, in some instances, three sets of documents can be retrieved—a first set documents that match terms included in the query, a second set of documents that refer to the same entities as the query, and a third set of documents that are linked to the first documents and/or the second documents, as discussed more below.

Next, graph construction 410 can be performed on the retrieved documents 406 to obtain an evidence graph 412. For instance, in some cases, links are established between every pair of retrieved documents to create a fully-connected evidence graph. In other cases, links are established between pairs of documents based on criteria such as similarity between the documents, linking documents that mention the same entity, existing hyperlinks between the retrieved documents, etc.

Next, a transformer 414 can be applied to the evidence graph 412. By processing the evidence graph, the transformer can produce contextualized semantic representations 416 of the words in one or more of the retrieved documents. As described more below, the transformer can obtain initial word embeddings for each word in the query and each of the documents. Next, the transformer can apply intra-document and inter-document attention processing on the word embeddings to produce contextual word embeddings. The contextual word embeddings can include intra-document contextual information relating to intra-document context (e.g., information relating to other words in the same document) as well as inter-document contextual information (e.g., information relating to other documents). The transformer can include an intra-document attention mechanism that produces the intra-document contextual information, and an inter-document attention mechanism that produces the inter-document contextual information, as discussed more below.

The contextualized semantic representations 416 output by the transformer 414 can be processed using span extraction 418 to extract a span of words that represents the final answer 420 to the query. For instance, as described more below, span extraction can be performed by one or more neural network layers that determine respective likelihoods that each word in the documents is either (a) the first word in the answer or (b) the last word in the answer. The final span can be selected based on the probabilities, e.g., the selected span can begin with a word having a relatively high or highest start probability and can end with a word having a relatively high or highest end probability.

Example Evidence Graph

Figure 5:
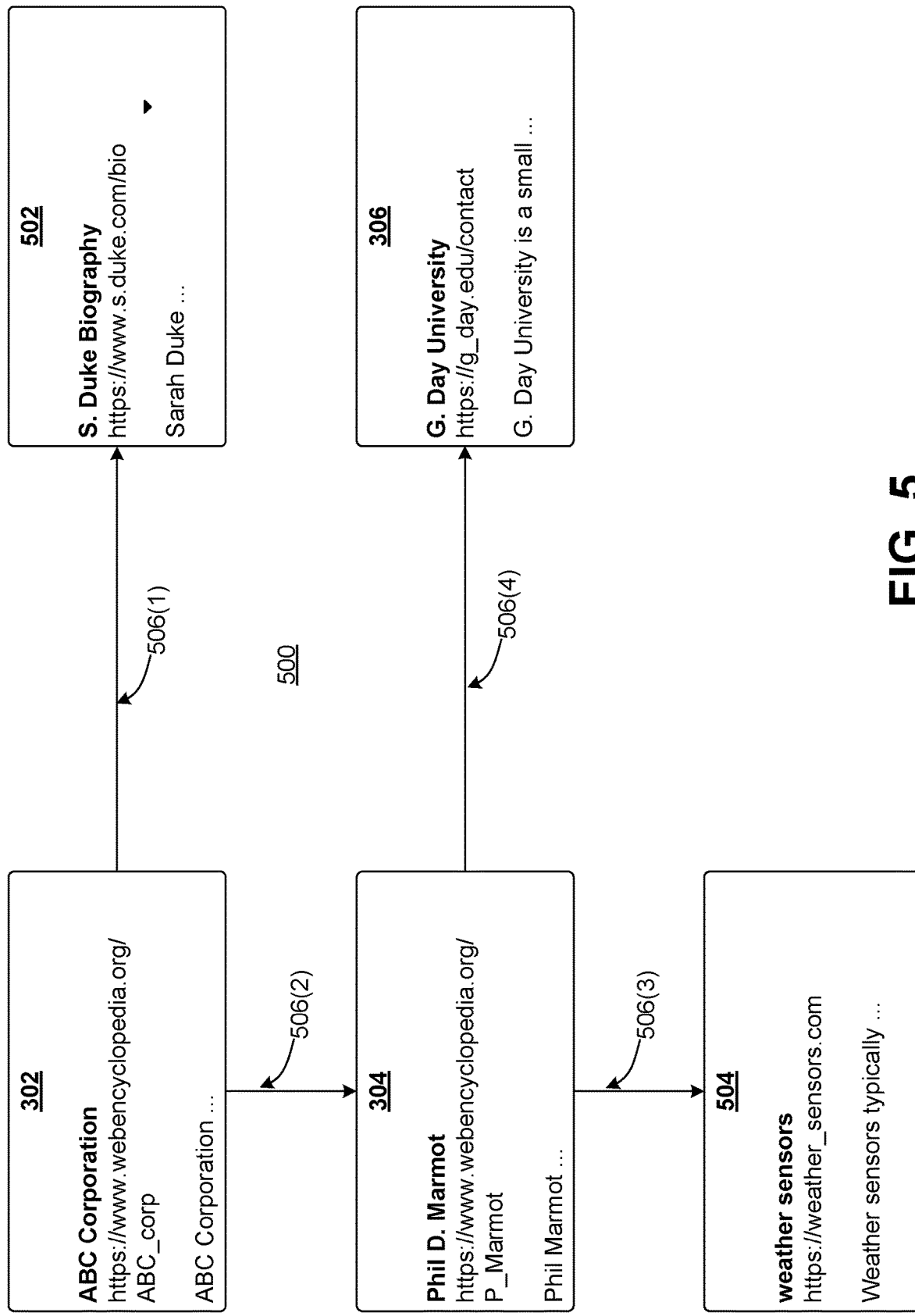
FIG. 5 illustrates an example evidence graph for providing an answer to a query, consistent with some implementations of the present concepts.

FIG. 5 illustrates an example evidence graph 500 that includes documents 302, 304, and 306, discussed above with respect to FIG. 3, as well as two additional documents 502 and 504. Each document can server as a node in the evidence graph. For the purposes of example, assume that document 302 is retrieved during an initial search for the query "In what city was ABC Corp. launched?" Further, assume that document 302 includes hyperlinks to documents 502 (S. Duke's biography) and 304 (P. Marmot's biography). Further assume that document 304 includes hyperlinks to documents 306 (G. Day University's homepage) and 504 (a webpage about weather sensors).

As noted above, documents 302, 304, and 306 provide sufficient information to derive the correct answer to the query. Documents 502 and 504 are additional documents that can be retrieved and processed as described herein. In this example, the evidence graph includes one link 506 for each hyperlink in the corresponding document. As described below, the inter-document attention mechanism of transformer 414 can be utilized to reason over these five documents. By doing so, it is possible to automate reasoning over these five documents to obtain an answer using evidence obtained in a subset of the documents, i.e., documents 302, 304, and 306. The inter-document attention mechanism can contribute both to automating inferences over documents 302, 304, and 306, and also to inferring that documents 502 and 504 do not include information useful for answering the query.

Each link in the evidence graph 500 can be considered a "hop" across a set of linked documents. Thus, automated reasoning over documents 302, 304, and 306 can be considered as solving a question answering problem that involves "two-hop" reasoning. The disclosed implementations can be employed using different numbers of hops over supporting documents, e.g., by configuring and/or learning a number of hops to perform for a given task.

Example Transformer

Figure 6:
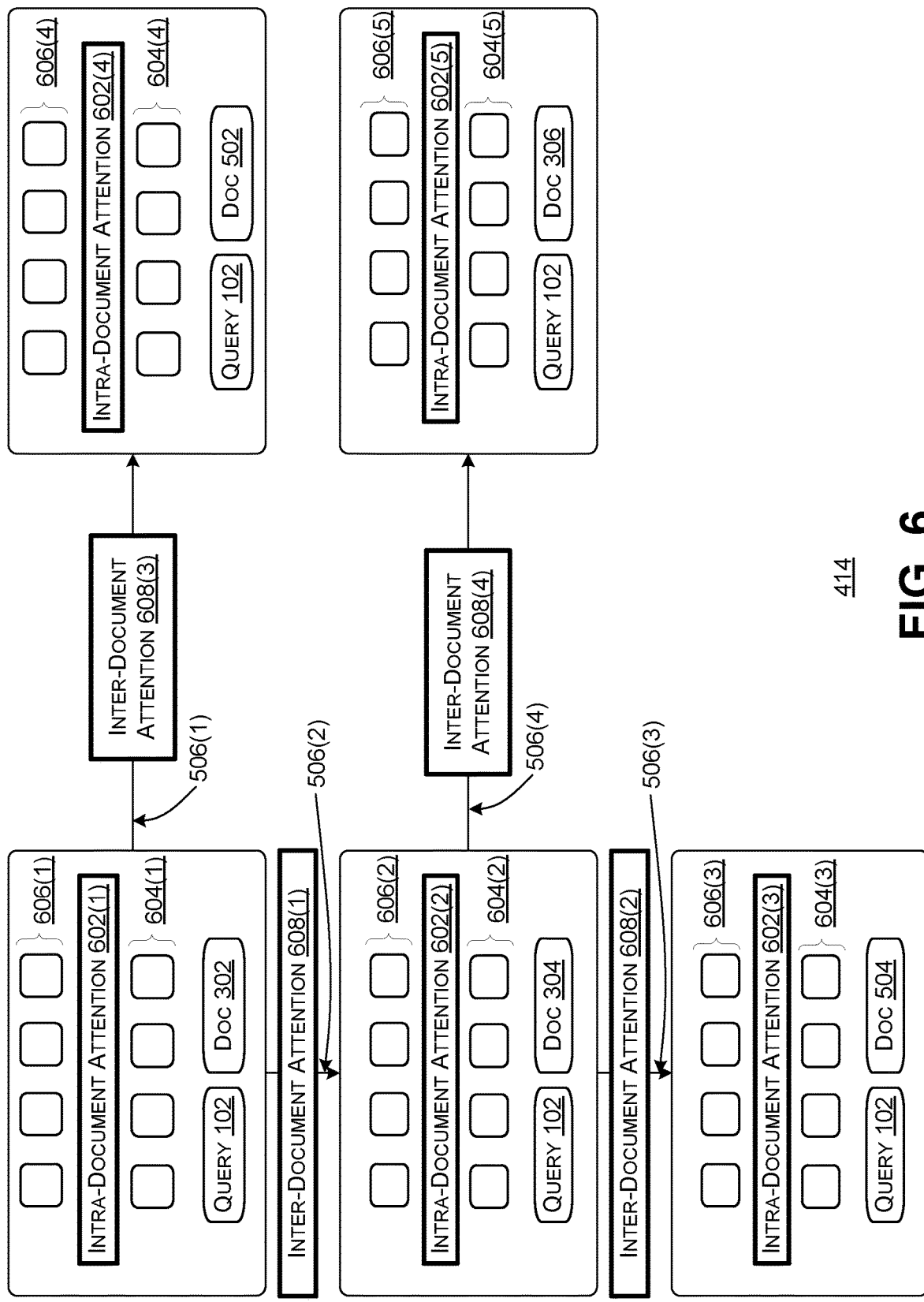
FIG. 6 illustrates components of an example transformer, consistent with some implementations of the present concepts.

FIG. 6 illustrates certain components of transformer 414 that can be used to analyze evidence graph 500. First, the query 102 can be concatenated with each retrieved document for processing via intra-document attention mechanism 602, which can be applied individually to each document. As shown in FIG. 6, intra-document attention mechanism 602(1) can be applied to a concatenation of the query and document 302, intra-document attention mechanism 602(2) can be applied to a concatenation of the query and document 304, intra-document attention mechanism 602(3) can be applied to a concatenation of the query and document 504, intra-document attention mechanism 602(4) can be applied to a concatenation of the query and document 502, and intra-document attention mechanism 602(5) can be applied to a concatenation of the query and document 306.

To implement the intra-document attention mechanism 602, the concatenated query/document pairs can be processed using a lexicon encoder to produce word embedding vectors 604 that represent individual words in a vector space where semantically-similar and/or syntactically-similar words are relatively close to one another, and less semantically-similar or words, sentences are relatively further apart. Specific tokens can be used to delineate the beginning of each sequence, and to separate individual sentences in a given sequence. In some implementations, word embedding vectors are constructed by summing corresponding word, segment, and positional embeddings for each word.

The intra-document attention mechanism 602 can process the word embedding vectors to obtain intra-document contextual information for each word, e.g., via self-attention, and generate a sequence of contextual embedding vectors 606 that include the intra-document contextual information. Self-attention can be used to relate different positions of words within a document by computing similarities between the words. These similarities are then used to calculate the intra-document contextual information of each word as a function of (1) the similarities to the other words in the document and (2) the representations of the other words in the document, as described more below. In some instances, the intra-document attention mechanism 602 is implemented using a multilayer bidirectional transformer encoder that is configured to map the embedding vectors 604 into the contextual embedding vectors 606.

Inter-document attention mechanism 608 can modify the contextual semantic representations of each word by incorporating inter-document contextual information into the contextual semantic representations. For instance, the inter-document contextual information can be added to the contextual embedding vectors 606 produced for each document. To determine the inter-document contextual information, the inter-document attention mechanism can compute the similarity of the individual words in each linked document to other documents to which it is linked. The word-to-document similarities can be used to calculate the inter-document contextual information for each word based on (1) its similarities to each linked document and (2) the representations of those documents, as described more below.

The output of transformer 414 includes contextualized semantic representations of the words in the documents that include both intra- and inter-document contextual information. As discussed more below, the contextualized semantic representations can be processed to extract a span of words that answers a received query using one or more span extraction layers. Because the contextualized semantic representations convey relationships between words in one document to other documents in the evidence graph, the contextualized semantic representations can be used to derive information from a particular document using supporting evidence contained in other documents.

Specific Algorithms

The following section provides specific algorithms and mathematical details that can be employed to achieve various concepts described above. Note that the examples described above refer to "words" in the documents and query for ease of exposition. However, in some implementations, word tokenization processes can be employed to represent certain words in queries and documents as word tokens, some of which can represent in-vocabulary words in queries and/or documents, and others that represent parts of individual words.

Intra-Document Attention

The following describes one algorithm that can be used to implement the intra-document attention mechanism 602 shown in FIG. 6. A transformer or other encoder can learn to convert a sequence of input text tokens: $X=\{x_1, \ldots, x_i, \ldots, x_n\}$, into contextualized semantic representations: $H=\{h_1, \ldots, h_i, \ldots, h_n\}$. The contextualized semantic representations can include semantic information for the corresponding token as well as intra-document contextual information provided in the text sequence. This process can involve multiple stacked network layers, which convert X layer by layer into $\{H^0, H^1, \ldots, H^l, \ldots H^L\}$, with $H^0$ being the token embeddings.

In performing intra-document attention, transformer 414 can evaluate three components: Query (Q), Key (K), and Value (V). Together, these can be used to calculate the layer output $H^l$ for the l-th layer using the input $H^{l-1}$ from the previous layer:

$$H^l = \text{softmax}\left(\frac{Q \cdot K^T}{\sqrt{d_k}}\right) \cdot V^T \quad (1)$$

$$Q^T; K^T; V^T = W^q \cdot H^{l-1}; W^k \cdot H^{l-1}; W^v \cdot H^{l-1} \quad (2)$$

where Q, K, and V are three projections on the input $H^{l-1}$. Softmax can be calculated on the row dimension of an intra-document attention matrix, which is the product of Q and V, scaled by the dimension of them ($d_k$).

Specifically, for the token $h_i^l$, its corresponding slice in Eqn. 2 is:

$$h_i^l = \sum_j \text{softmax}_j\left(\frac{q_i^T \cdot k_j}{\sqrt{d_k}}\right) \cdot v_j \quad (3)$$

which first calculates the attention of $h_i^l$ to all other tokens j in the same document, using its query $q_i$ and the corresponding keys $k_j$, and then uses the normalized attention weights to combine with other tokens' values $v_j$ to its new representation $h_i^l$.

This intra-document attention mechanism effectively propagates information between some or all token pairs in a given document. Multiple intra-document attention mechanisms can also be used in one transformer layer of a given transformer, and then concatenated as multi-head attentions within that transformer. In some implementations, the contextualized semantic representations include token embeddings, segment embeddings, and position embeddings. The position embeddings allow the transformer to omit modeling of explicit sequential structure, such as occurs in recurrent networks. This can make the transformer efficient to train, and also allows transformer layers to be stacked to obtain rather deep networks.

Inter-Document Attention

The following describes one algorithm that can be used to implement the inter-document attention mechanism 608 shown in FIG. 6. Generally, inter-document attention can be used to model non-sequential text structures as separate documents. For example, different files or webpages, different paragraphs grouped in subsections, or different conversations with co-references to one another can be treated as different documents. More generally, references herein to different "documents" merely implies different text structures that do not originally occur sequentially. Thus, for instance, two paragraphs in the same file but located in different document sections can be treated as different documents using the disclosed techniques.

Formally, inter-document attention can be performed using a set of documents, $\chi=\{X_1, \ldots, X_\tau, \ldots X_\zeta\}$, and an edge matrix E, which includes connections between certain documents. The inter-document attention mechanism 608 can encode the documents into representations $\mathcal{H} = \{\tilde{H}_1, \ldots, \tilde{H}_\tau, \ldots, \tilde{H}\zeta\}$, that include both global information across documents (inter-document contextual information) but also the local signals in each X (intra-document contextual information).

The inter-document attention mechanism 608 can propagate attention information along the edges of an evidence graph as follows. The intra-document attention for a token i can be computed from other tokens in the same document as:

$$h_{\tau,i}^l = \sum_j \text{softmax}_j\left(\frac{q_{\tau,i}^T \cdot k_{\tau,j}}{\sqrt{d_k}}\right) \cdot v_{\tau,j} \quad (4)$$

Next, the inter-document attention can be computed using the corresponding CLS token as a representation of a given document by aggregating the respective CLS tokens of other connected documents η as follows:

$$\hat{h}_{\tau,i}^l = \sum_{\eta; E_{\tau\eta}=1} \text{softmax}_\eta\left(\frac{\hat{q}_{\tau,i}^T \cdot \hat{k}_{\eta,0}}{\sqrt{d_k}}\right) \cdot \hat{v}_{\eta,0} \quad (5)$$

Thus, semantic representations maintained in the l-th layer can include intra-document attention as described above as well as inter-document attention. The inter-document attention $\hat{h}_{\tau,i}^l$ includes information obtained from other connected documents in the evidence graph. Generally, the inter-document attention mechanism can follow the edges $E_{\tau\eta}$, attend on the first token in each connected document (e.g. a "[CLS]" token representing the document as a whole), and combine their representations to a corresponding hop representation $\hat{h}^l$. The inter- and intra-document attentions can be concatenated to the l-th layer's representation $\tilde{H}_\tau$. The new representation of the first token of a document can be determined as a linear combination of the intra-document representation and inter-document representations as follows:

$$\tilde{h}_{\tau,0}^l = \text{Linear}([h_{\tau,0}^l \circ \hat{h}_{\tau,0}^l]) \qquad (6)$$

Layers that implement inter-document attention can be stacked multiple times. The inter-document attention can move along the evidence graph and propagate the learned representations across the graph following the edge matrix E. Thus, given L layers, inter-document attention can be propagated along graph paths of length L, and the resulting contextualized semantic representations $\mathcal{H}$ can capture the structural information between the documents. Note that other tokens within a given document can updated by intra-document attention from the CLS token for that document, which itself conveys inter-document contextual information. As a consequence, each token within a given document can convey semantic meaning derived from one or more other linked documents in the evidence graph.

Transformer 414 can adopt other parts of other transformer mechanisms, such as layer norm and feedforward, without modification. In some cases, an additional projection layer can be added to project the semantic representations maintained by the inter-document attention mechanism 608 into the same space as the semantic representations maintained by the intra-document attention mechanism 602.

Background information on transformer-based approaches can be found at Vaswani, Shazeer, Parmar, Uszkoreit, Jones, Gomez, Kaiser, and Polosukhin, "Attention Is All You Need," in Advances in Neural Information Processing Systems, pp. 5998-6008, 2017, as well as Devlin, Chang, Lee, and Toutanova, "Bert: Pre-training of Deep Bidirectional Transformers for Language Understanding," in Proceedings of the 2019 Conference of the North American Chapter of the Association for Computational Linguistics: Human Language Technologies, Volume 1 (Long and Short Papers), pp. 4171-4186, 2019.

In some implementations, the intra-document attention mechanism can be initialized using a pre-trained model such as BERT. The inter-document attention mechanism can be initialized randomly and trained from scratch. In addition, some implementations may constrain the number of attention hops to a specific number of linked documents, e.g., three.

Question Answering

The following describes one algorithm that can be used to provide an answer to a received query. The contextualized semantic representations produced by transformer 414 can be processed to identify an answer span a from documents in a corpus, such as a web encyclopedia, for a natural language question q. As noted above, in some cases, information from multiple evidence documents can be leveraged to answer the question. The inter-document attention mechanism 608 of the transformer provides the capability to combine and reason on signals from different documents.

As noted above, the workflow 400 can involve retrieving related documents for a given query. Once the documents are retrieved, an evidence graph can be constructed and transformer 414 can process the evidence graph to obtain contextualized semantic representations of words in or more of the documents. The final contextualized semantic representations (e.g., vectorized contextual embeddings) can be processed using one or more span extraction layers to extract a final answer to the query.

One specific approach to retrieving relevant documents D for the query q involves the following three sources:

$D_{ir}$: the top retrieved documents via a term-matching technique such as term-frequency, inverse-document frequency retrieval as discussed in Danqi Chen, Adam Fisch, Jason Weston, and Antoine Bordes, "Reading Wikipedia to Answer Open-Domain Questions," in Proceedings of the 55th Annual Meeting of the Association for Computational Linguistics (Volume 1: Long Papers), pp. 1870-1879, 2017.

$D_{kg}$: documents associated with one or more entities that appear in q, as annotated by an entity linking systems such as Ferragina and Ugo Scaiella, "TAGME: On-the-fly Annotation of Short Text Fragments (by Wikipedia Entities)," in Proceedings of the 19th ACM International Conference on Information and Knowledge Management, pp. 1625-1628. ACM, 2010, or retrieved using another entity-matching technique, $D_{exp}$: the documents connected to documents in $D_{ir} \cup D_{kg}$ by either links in documents in $D_{exp}$ to documents in $D_{ir}$ or $D_{kg}$, or by links in documents in $D_{ir}$ or $D_{kg}$ to documents in $D_{exp}$.

The documents in $D_{ir}$ and $D_{kg}$ can be ranked and the top K documents from each can be included in $D_{exp}$. One example ranking mechanism is found at Rodrigo Nogueira and Kyunghyun Cho., "Passage Re-ranking with Bert," in arXiv preprint arXiv:1901.04085, 2019.

The three sources can include documents connected to q from different aspects and can be merged to $D=D_{ir} \cup D_{kg} \cup D_{exp}$. In some implementations, the evidence graph is fully connected, e.g., a link is established between each document in D, and the inter-document attention mechanism 608 in the transformer 414 can model connections between each of the documents. In other implementations, specific document pairs are selected to receive edges based on document similarity, co-presence of entities, or using hyperlinks or other connections within the documents as edges of the graph, and other document pairs do not have edges therebetween.

Some implementations can obtain the inputs to the transformer 414 as follows. The first paragraph in each $d_\tau$ can be concatenated to the question q:

$$X_\tau = X_q \circ X_{d_\tau} \qquad (7)$$

with $X_q$ and $X_{d_\tau}$ denotes the tokens in q and $d_\tau$, respectively. In cases where the documents are linked by a hyperlink, the anchor text for the hyperlink can also be included in the concatenation. This forms a semi-structured reasoning graph with $\chi = \{X_1, \ldots, X_\tau, \ldots, X_n\}$ and edge matrix E as the input. To extract a span from a given document, two span prediction layers can be used predict the start and end of the answer span, using the following approach. First, the final representations produced by the transformer can be designated:

$$\mathcal{H}^L = \text{Transformer-}\mathcal{X}H(\chi,E) \qquad (8)$$

The probabilities of a token i in a document r being the start or end of the answer span can be calculated using two task-specific layers as follows:

$$p(\text{start}|\tau,i), p(\text{end}|\tau,j) = \text{Linear}(\hat{h}_{\tau,i}^L), \text{Linear}(\hat{h}_{\tau,j}^L) \qquad (9)$$

$$p(\text{relevance}|\tau) = \text{Linear}(\hat{h}_0^L) \qquad (10)$$

where the one task-specific layer predicts the relevance of each document and the another task-specific layer extracts the answer span from that document.

Transformer 414 can be trained using cross-entropy loss on span prediction accuracy given a set of labeled spans that provide the correct answer to example queries, where the correct answers involve reasoning over supporting evidence spread across multiple documents. The cross-entropy loss can reflect both accuracy at predicting the correct document from which to select the answer, as well as predicting the correct span from that document.

Example System

Figure 7:
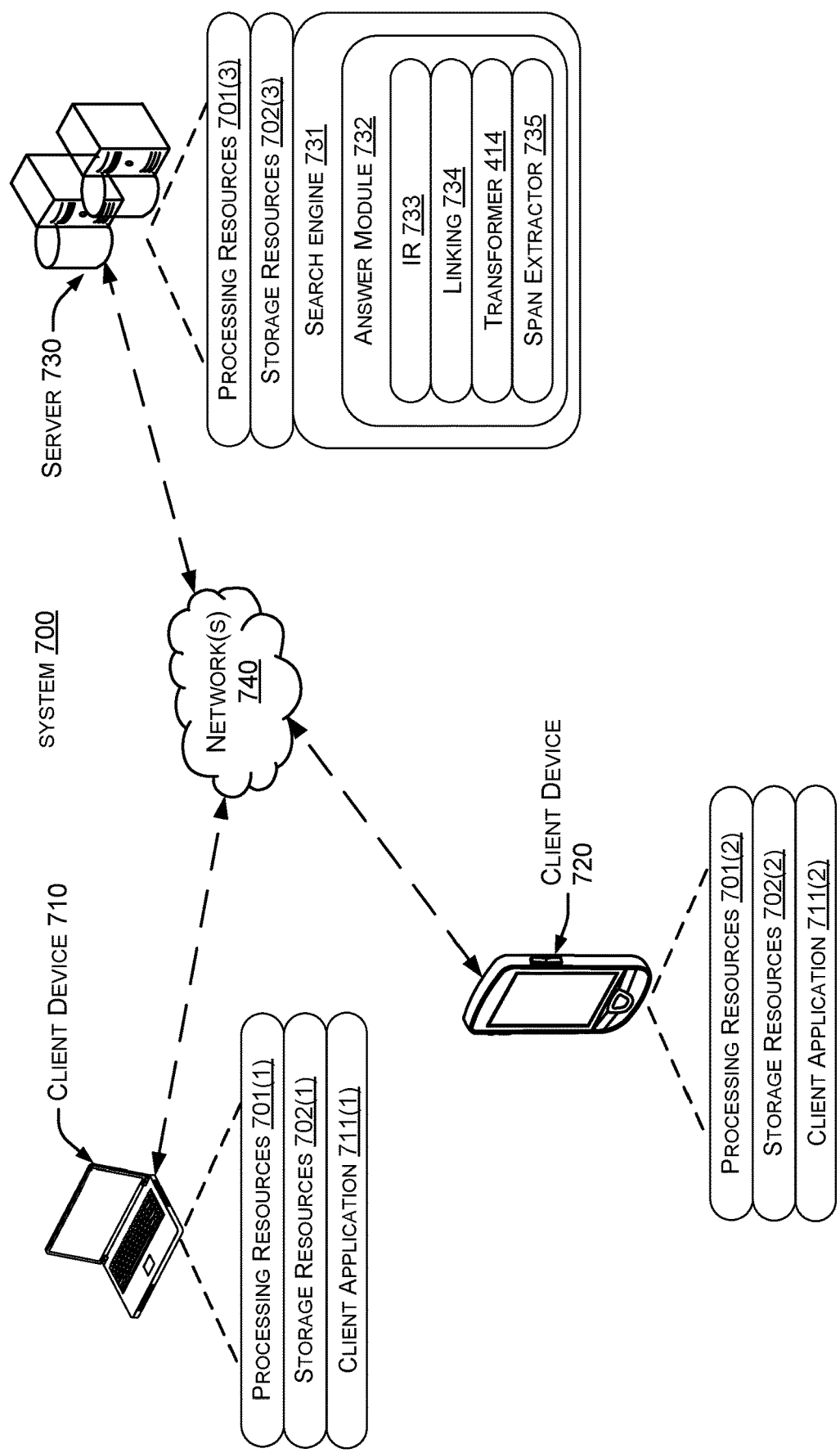
FIG. 7 illustrates an example system, consistent with some implementations of the present concepts.

The present implementations can be performed in various scenarios on various devices. FIG. 7 shows an example system 700 in which the present implementations can be employed, as discussed more below. As shown in FIG. 7, system 700 includes a client device 710, a client device 720, and a server 730, connected by one or more network(s) 740. Note that the client devices can be embodied both as mobile devices such as smart phones or tablets, as well as stationary devices such as desktops. Likewise, the server can be implemented using various types of computing devices. In some cases, any of the devices shown in FIG. 7, but particularly the server, can be implemented in a data center, server farm, etc.

Certain components of the devices shown in FIG. 7 may be referred to herein by parenthetical reference numbers. For the purposes of the following description, the parenthetical (1) indicates an occurrence of a given component on client device 710, (2) indicates an occurrence of a given component on client device 720, and (3) indicates an occurrence on server 730. Unless identifying a specific instance of a given component, this document will refer generally to the components without the parenthetical.

Generally, the devices 710, 720, and 730 may have respective processing resources 701 and storage resources 702, which are discussed in more detail below. The devices may also have various modules that function using the processing and storage resources to perform the techniques discussed herein. For example, client devices 710 and 720 can include respective instances of a client application 711. The client application can include any kind of functionality that can perform querying functionality. For instance, the client application could be a web browser that allows a user to submit a search query to a search website. As another example, the client application could be a digital assistant that responds to user voice inputs by querying a search website and responding to the user with a spoken answer.

The server 730 can include a search engine 731 that performs search functionality in response to user queries. The search engine can include an answer module 732 that responds to certain queries with answers by performing workflow 400. The answer module 732 can include an information retrieval module 733, a linking module 734, transformer 414, and a span extractor 735. The information retrieval module can retrieve one or more sets of documents as described above. The linking module can link the documents to create an evidence graph, as described above. The transformer can process the evidence graph using inter-document and intra-document attention mechanisms to produce contextualized semantic word representations as described above. The span extractor can process the contextualized semantic word representations to identify a span of words in a given document that answers the query, as described above.

Note that system 700 is merely an example and is provided to illustrate one possible arrangement of functionality on one or more devices. For example, in some cases, the answer module 732 is on a different server than the search engine, and indeed may retrieve documents from multiple different search engines or other information sources. More generally, the disclosed functionality can be distributed across one or more devices in various fashions without departing from the present concepts.

First Example Method

Figure 8:
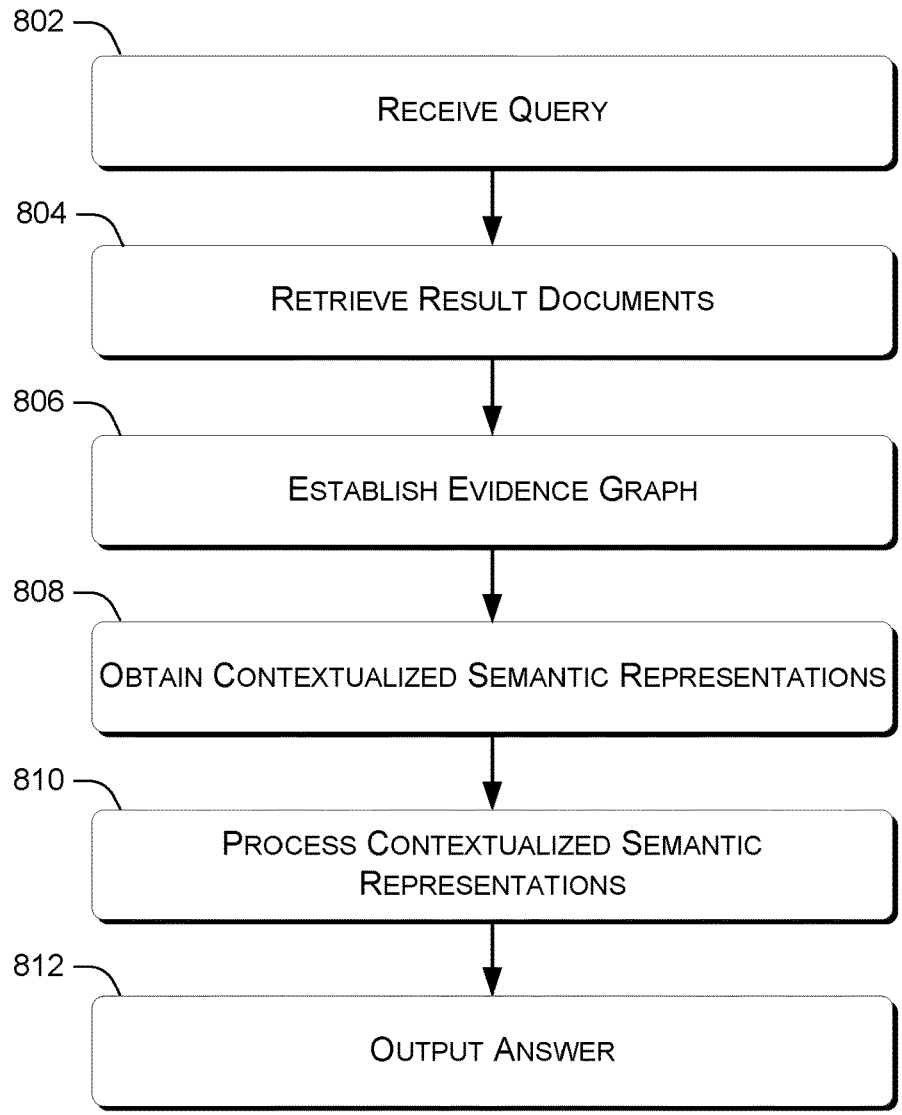
FIGS. 8 and 9 illustrate example methods, consistent with some implementations of the present concepts.

FIG. 8 illustrates an example method 800 that can be used to answer a question or query, consistent with the present concepts. As discussed elsewhere herein, method 800 can be implemented on many different types of devices, e.g., by one or more cloud servers, by a client device such as a laptop, tablet, or smartphone, or by combinations of one or more servers, client devices, etc.

Method 800 begins at block 802, where a query is received. The query can be received as text submitted to a search engine, as a voice input, or in various other forms.

Method 800 continues at block 804, where result documents are obtained. For instance, the result documents can be retrieved from a document repository such as the index of a general web search engine, from an online encyclopedia or other curated corpus, etc.

Method 800 continues at block 806, where an evidence graph is established. As noted, the evidence graph can be fully connected or can include links between certain documents but not others. In some cases, the links in the evidence graph are based on links in the documents themselves, e.g. hyperlinks between two retrieved documents. In other cases, the documents can be processed to select pairs of documents to link. For instance, the evidence graph can link documents that mention the same entity, documents having a semantic similarity exceeding a threshold, etc.

Method 800 continues at block 808, where contextualized semantic representations are obtained. As noted, the contextualized semantic representations can include word embeddings, segment embeddings, position embeddings, intra-document contextual information, and inter-document contextual information.

Method 800 continues at block 810, where the contextualized semantic representations are processed to identify an answer to the query. For instance, the answer can be a particular span of words selected from a particular result document.

Method 800 continues at block 812, where the answer is output in response to the query. For instance, the answer can be output on a search results webpage, via spoken output from a digital assistant, etc.

Second Example Method

Figure 9:
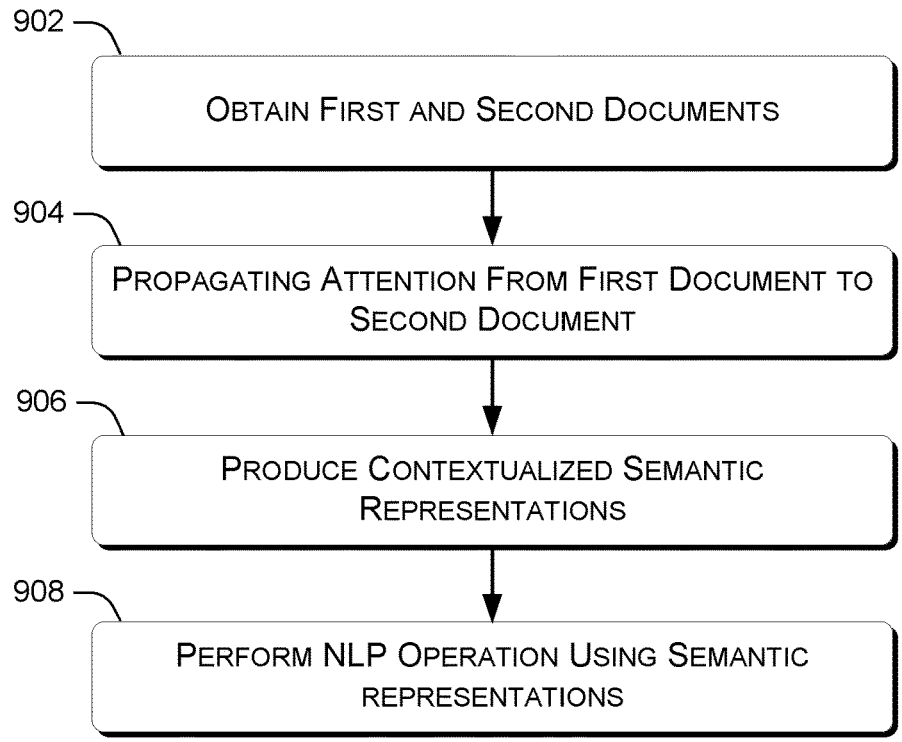

FIG. 9 illustrates an example method 900 that can be used to perform natural language processing, consistent with the present concepts. As discussed elsewhere herein, method 900 can be implemented on many different types of devices, e.g., by one or more cloud servers, by a client device such as a laptop, tablet, or smartphone, or by combinations of one or more servers, client devices, etc.

Method 900 begins at block 902, where a first document and a second document are obtained. In some cases, the documents are obtained by querying a document repository. In other cases, the documents can be obtained in other means, e.g., by crawling links from one document to another, by randomly sampling documents from a topic-specific curated corpus, by selecting documents based on semantic similarity, etc.

Method 900 continues at block 904, where attention is propagated from the first document to the second document. As noted above, attention can be propagated with one or more layers of a neural network. In other contexts, propagating attention can involve any process whereby the similarity of a particular word in the second document to the first document is used to derive a semantic representation of that word.

Method 900 continues at block 906, where contextualized semantic representations are obtained based on the propagating. As noted previously, the contextualized semantic representations can include inter-document contextual information and, in some cases, intra-document contextual information. In some cases, the contextualized semantic representations for words a particular document can include at least the following distinct sets of bits: a word or token embedding, a segment embedding, a position embedding, inter-document contextual information, and intra-document contextual information for one or more other documents.

Method 900 continues at block 908, where a natural language processing operation is performed using the contextualized semantic representations. As described more below, query answering is but one example of a natural language processing operation that can be employed using contextualized semantic representations as described herein.

Applications

As discussed above, one application of the disclosed techniques involves answering a question for a user. However, contextualized semantic representations derived using the techniques described herein can be employed for other natural language processing applications besides question answering. The following describes a few alternative applications that can be implemented using contextualized semantic representations obtained using the disclosed techniques.

For instance, given a collection of documents, contextualized semantic representations of the terms in the documents can be input to a decoder to obtain a summary of the collection of linked documents. As another example, contextualized semantic representations can be used for machine translation of a collection of documents from a first natural language (e.g., English) to another natural language (e.g., French). In addition, two different document collections can be compared by processing contextualized semantic representations of individual documents in each collection. For instance, this could reveal scenarios where two different document collections provide approximately the same amount of information content, despite differing numbers of documents or different types of documents in the respective collections.

Characteristics of Inter-Document Attention

As previously noted, text can have sequential structures, such as sentences and paragraphs, as well as non-sequential structures, such as links between different documents. Within a given file, text can be organized in hierarchies such as sentences, paragraphs, and sections, or more complex structures such as tables, lists, and web pages. Web documents can be connected by hyperlinks or search click graphs. The disclosed implementations can treat non-sequential text structures as different documents and evaluate them using inter-document attention as described herein. The following describes some characteristics of the disclosed inter-document attention mechanisms relative to alternative approaches for automated question answering using evidence contained in multiple documents.

For instance, one alternative approach would be to simulate cross-document relations by assembling different document-specific models and fusing the output of each model. However, this approach can lead to complicated pipelines and cascade errors. In contrast, the disclosed inter-document attention mechanism enables the intrinsic modeling of inter-document relationships.

The inter-document attention mechanism can be employed in a unified transformer representation that can applied to answer a question by evaluating evidence spread over multiple documents. As discussed more below, the disclosed implementations were evaluated for answer accuracy on Hotpot QA's full Wiki setting and outperformed previous published models by large margins.

The following table presents experimental results that were obtained using the disclosed implementations ("Inter-document attention") on $H_{OTPOT}$ QA (full-wiki setting):

|  | Dev | | | | | | Test | | | | | |
| --- | --- | --- | --- | --- | --- | --- | --- | --- | --- | --- | --- | --- |
|  | Ans | | Supp | | Joint | | Ans | | Supp | | Joint | |
| Model | EM | F1 | EM | F1 | EM | F1 | EM | F1 | EM | F1 | EM | F1 |
| Yang et al. (2018) | 23.9 | 32.9 | 5.1 | 40.9 | 47.2 | 40.8 | 24.0 | 32.9 | 3.9 | 37.7 | 1.9 | 16.2 |
| SR-MRS | 46.5 | 58.8 | 39.9 | 71.5 | 26.6 | 49.2 | 45.3 | 57.3 | 38.7 | 70.8 | 25.1 | 47.6 |
| Inter-document attention | 49.8 | 62.3 | 42.2 | 71.6 | 27.4 | 51.0 | 49.0 | 60.8 | 41.7 | 70.0 | 27.1 | 49.6 |

As can be seen above, the disclosed inter-document attention mechanism obtains state-of-the-art performance for answering questions that involve reasoning over multiple documents. Additional information on Yang et al. can be found at Zhilin Yang, Peng Qi, Saizheng Zhang, Yoshua Bengio, William W. Cohen, Ruslan Salakhutdinov, and Christopher D. Manning, "HotpotQA: A Dataset for Diverse, Explainable Multi-hop Question Answering," in Proceedings of the Conference on Empirical Methods in Natural Language Processing (EMNLP), 2018. Additional information on SR-MRS can be found at Yixin Nie, Songhe Wang, and Mohit Bansal. "Revealing the Importance of Semantic Retrieval for Machine Reading at scale," arXiv preprint arXiv:1909.08041, 2019.

Device Implementations

As noted above with respect to FIG. 7, system 700 includes several devices, including a client device 710, a client device 720, and a server 730. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. In some cases, the modules of system 700 are provided as executable instructions that are stored on persistent storage devices, loaded into the random-access memory devices, and read from the random-access memory by the processing resources for execution.

As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 740. Without limitation, network(s) 740 can include one or more local area networks (LANs), wide area networks (WANs), the Internet, and the like.

In addition, some implementations may employ any of the disclosed techniques in an Internet of Things (IoT) context. In such implementations, a home appliance or automobile might provide computational resources that implement the modules of system 700.

Various device examples are described above. Additional examples are described below. One example includes a method performed on a computing device, the method comprising receiving a query, retrieving a plurality of result documents related to the query, establishing an evidence graph having links between individual result documents, obtaining contextualized semantic representations for individual words in a second result document by propagating inter-document attention from a first result document that is linked to the second result document in the evidence graph, processing the contextualized semantic representations of the individual words in the second result document using a machine learning model to obtain an answer to the query, and outputting the answer in response to the query.

Another example can include any of the above and/or below examples where propagating the inter-document attention comprises determining inter-document contextual information for a particular word in the second result document based at least on similarity of the particular word to the first result document.

Another example can include any of the above and/or below examples where the method further comprises determining intra-document contextual information for the particular word in the second result document based at least on similarity of the particular word to other words in the second result document.

Another example can include any of the above and/or below examples where the contextualized semantic representations of the individual words in the second result document comprise contextualized embedding vectors.

Another example can include any of the above and/or below examples where the machine learning model is a neural network and the obtaining the contextualized semantic representations is performed in the neural network.

Another example can include any of the above and/or below examples where the method further comprises determining the inter-document contextual information using an inter-document attention layer of the neural network, determining the intra-document contextual information using an intra-document attention layer of the neural network, and extracting the answer from the contextualized semantic representations using a span extraction layer of the neural network.

Another example can include any of the above and/or below examples where the method further comprises concatenating the query to each of the plurality of result documents to obtain query-document pairs and processing two or more of the query-document pairs in the inter-document attention layer.

Another example can include any of the above and/or below examples where the method further comprises using the span extraction layer of the neural network, determining respective likelihoods that the individual words in the second result document are the first word of the answer to the query.

Another example can include any of the above and/or below examples where the method further comprises training the neural network using labeled training data comprising labeled examples, the labeled examples comprising example queries, example answers, and example supporting documents having supporting evidence for the example answers spread across at least two example supporting documents.

Another example can include any of the above and/or below examples where the method further comprises retrieving a first set of result documents using a term matching technique, retrieving a second set of result documents using an entity matching technique, and retrieving a third set of result documents that are linked to at least one document in the first set or the second set.

Another example can include any of the above and/or below examples where the method further comprises connecting each result document in the first set, the second set, and the third set to form the evidence graph as a fully-connected graph.

Another example can include any of the above and/or below examples where the method further comprises selecting pairs of result documents to link in the evidence graph based at least on existing links in the result documents.

Another example includes a computer-readable storage medium storing computer-readable instructions which, when executed by a hardware processing unit, cause the hardware processing unit to perform acts comprising obtaining a first document and a second document, propagating attention from the first document to the second document, and based at least on the propagating, producing contextualized semantic representations of individual words in the second document, where wherein the contextualized semantic representations provide a basis for performing one or more natural language processing operations.

Another example can include any of the above and/or below examples where the first document and the second document comprise separate webpages or separate files.

Another example can include any of the above and/or below examples where the acts further comprise generating an evidence graph having a plurality of documents and a plurality of links, the evidence graph having the first document as a first node, the second document as a second node, and a link between the first document and the second document and propagating the attention over the link between the first document and the second document.

Another example includes a system comprising a hardware processing unit and a storage resource storing computer-readable instructions which, when executed by the hardware processing unit, cause the hardware processing unit to: receive a query, obtain a plurality of search results that are responsive to the query, process the plurality of search results using a transformer having an inter-document attention mechanism to obtain an answer to the query, and respond to the query with the answer.

Another example can include any of the above and/or below examples where the answer comprises a span of text retrieved from a particular search result based at least on supporting evidence provided by another search result.

Another example can include any of the above and/or below examples where the transformer comprises one or more layers of a neural network.

Another example can include any of the above and/or below examples where the neural network comprises a span extraction layer configured to extract the answer.

Another example can include any of the above and/or below examples where the neural network comprises an intra-document attention mechanism.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   receiving a query;
   retrieving result documents related to the query;
   establishing an evidence graph having nodes representing the result documents and links connecting individual result documents;
   obtaining contextualized semantic representations for individual words in a second result document by propagating inter-document attention to the individual words from a first result document that is linked to the second result document in the evidence graph, the propagating being based at least on respective similarities of the individual words in the second result document to an entirety of the first result document;
   processing the contextualized semantic representations of the individual words in the second result document to obtain an answer to the query; and
   outputting the answer in response to the query.

2. The method of claim 1, wherein the establishing comprises fully connecting the evidence graph.

3. The method of claim 1, wherein the contextualized semantic representations for the individual words in the second result document include at least the following distinct sets of bits:
   a first set of bits representing a word or token embedding,
   a second set of bits representing intra-document contextual information obtained from other words in the second result document, and
   a third set of bits representing inter-document contextual information obtained by propagating the inter-document attention from the entirety of the first result document to the individual words in the second result document.

4. The method of claim 3, wherein the contextualized semantic representations for the individual words in the second result document include at least the following additional distinct sets of bits:
   a fourth set of bits representing a segment embedding, and
   a fifth set of bits representing a position embedding.

5. The method of claim 4, further comprising:
   determining the inter-document contextual information using an inter-document attention layer of a neural network;
   determining the intra-document contextual information using an intra-document attention layer of the neural network; and extracting the answer from the contextualized semantic representations using a span extraction layer of the neural network.

6. The method of claim 5, further comprising:
using the span extraction layer of the neural network, determining respective likelihoods that the individual words in the second result document are the first word of the answer to the query; and
selecting the answer based at least on the respective likelihoods.

7. The method of claim 6, further comprising:
training the neural network using labeled training data comprising labeled examples, the labeled examples comprising example queries, example answers, and example supporting documents having supporting evidence for the example answers spread across at least two example supporting documents.

8. The method of claim 1, further comprising:
representing the entirety of the first result document using a particular token; and
determining a particular semantic representation of the particular token based at least on corresponding representations of other tokens that represent respective entireties of other result documents that are connected to the first result document in the evidence graph,
wherein the inter-document attention is propagated from the first result document based at least on the particular semantic representation of the particular token.

9. The method of claim 8, further comprising:
determining the corresponding representations of the other tokens based at least on intra-document attention with respect to other tokens in the other result documents.

10. A computer-readable storage medium storing computer-readable instructions which, when executed by a hardware processing unit, cause the hardware processing unit to perform acts comprising:
establishing an evidence graph for a plurality of documents, the evidence graph representing the documents as nodes and having edges connecting the nodes;
propagating inter-document attention along the edges of the evidence graph, the propagating being based at least on respective similarities of individual words in the documents to entireties of other documents; and
based at least on the propagating, producing contextualized semantic representations of the individual words, wherein the contextualized semantic representations provide a basis for performing one or more natural language processing operations.

11. The computer-readable storage medium of claim 10, wherein each document is a separate file or a separate webpage.

12. The computer-readable storage medium of claim 10, the acts further comprising:
determining that particular documents of the plurality of documents mention the same entity; and
based at least on the determining that particular documents of the plurality mention the same entity, linking particular nodes in the evidence graph representing the particular documents.

13. The computer-readable storage medium of claim 10, the acts further comprising:
determining semantic similarities of the documents;
identifying particular documents with semantic similarities exceeding a threshold; and
based at least on the determining that the semantic similarities of the particular documents exceed the threshold, linking particular nodes in the evidence graph representing the particular documents.

14. The computer-readable storage medium of claim 10, the acts further comprising:
answering a question based at least on the contextualized semantic representations.

15. The computer-readable storage medium of claim 10, the acts further comprising:
tokenizing the words into tokens and determining the contextualized semantic representations for the tokens.

16. A system comprising:
a hardware processing unit; and
a storage resource storing computer-readable instructions which, when executed by the hardware processing unit, cause the hardware processing unit to:
receive a query;
obtain a plurality of search results that are responsive to the query;
connect at least some of the search results with edges to establish an evidence graph;
process the evidence graph using a transformer having an inter-document attention layer to obtain an answer to the query, the inter-document attention layer propagating inter-document attention from an entirety of a first search result to individual tokens in a second search result that is linked to the first search result in the evidence graph, the propagating being based at least on respective similarities of the individual tokens in the second search result to the entirety of the first search result; and
respond to the query with the answer.

17. The system of claim 16, wherein the computer-readable instructions, when executed by the hardware processing unit, cause the hardware processing unit to:
concatenate the query to each of the search results to obtain query-document pairs; and
process two or more of the query-document pairs in the inter-document attention layer.

18. The system of claim 17, wherein the computer-readable instructions, when executed by the hardware processing unit, cause the hardware processing unit to:
process the evidence graph using an intra-document attention layer, the intra-document attention layer propagating intra-document attention among respective tokens within each of the search results.

19. The system of claim 18, wherein the computer-readable instructions, when executed by the hardware processing unit, cause the hardware processing unit to:
determine contextualized semantic representations of the individual tokens based at least on the inter-document attention and the intra-document attention; and
extract the answer based at least on the contextualized semantic representations.

20. The system of claim 16, wherein the inter-document attention is propagated over at least two hops of the evidence graph.

* * * * *